(12) United States Patent
Schweiger et al.

(10) Patent No.: US 9,829,052 B2
(45) Date of Patent: Nov. 28, 2017

(54) SHIFTABLE CLUTCH OF A HYBRID DRIVE

(71) Applicant: Magna Powertrain AG & Co KG, Lannach (AT)

(72) Inventors: Wolfgang Schweiger, St. Stefan (AT); Martin Stocker, Graz (AT); Matthias Kohlhauser, Graz (AT); Gerhard Pichler, Stainz (AT); Dominik Schober, Graz (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 119 days.

(21) Appl. No.: 14/761,134

(22) PCT Filed: Jan. 16, 2014

(86) PCT No.: PCT/EP2014/050809
§ 371 (c)(1),
(2) Date: Jul. 15, 2015

(87) PCT Pub. No.: WO2014/114554
PCT Pub. Date: Jul. 31, 2014

(65) Prior Publication Data
US 2015/0369303 A1    Dec. 24, 2015

(30) Foreign Application Priority Data
Jan. 28, 2013  (DE) .......................... 10 2013 201 318

(51) Int. Cl.
*F16D 27/112*   (2006.01)
*F16D 27/115*   (2006.01)
(Continued)

(52) U.S. Cl.
CPC ............ *F16D 27/115* (2013.01); *B60K 6/387* (2013.01); *F16D 27/06* (2013.01); *F16D 27/08* (2013.01);
(Continued)

(58) Field of Classification Search
CPC ...... F16D 27/00–28/00; F16D 2300/14; B60K 6/387; Y10S 903/914
See application file for complete search history.

(56) References Cited

U.S. PATENT DOCUMENTS 2,057,876 A    10/1936  Berry
3,624,768 A *  11/1971  Nussli ................... F16D 27/112
                                                192/110 B
(Continued)

FOREIGN PATENT DOCUMENTS

DE        351527         4/1922
DE      2402743 A1       6/1975
(Continued)

*Primary Examiner* — Richard Lorence
(74) *Attorney, Agent, or Firm* — Dickinson Wright PLLC (57) ABSTRACT

The invention describes a switchable clutch for a motor vehicle with hybrid drive, wherein the hybrid drive has a voltage system with a voltage exceeding the 12-volt on-board electrical system voltage of the motor vehicle, composed of a friction disk clutch with an actuator, which can have electricity applied to it, for the actuation of the friction disk clutch in the sense of opening or closing, and wherein the actuator can be actuated with a voltage of the voltage system of the hybrid drive, said voltage exceeding the 12-volt on-board electrical system voltage of the motor vehicle.

12 Claims, 9 Drawing Sheets

(51) Int. Cl.
  *F16D 27/06* (2006.01)
  *F16D 27/08* (2006.01)
  *B60K 6/387* (2007.10)

(52) U.S. Cl.
  CPC ........ *F16D 27/112* (2013.01); *F16D 2300/14* (2013.01); *Y10S 903/914* (2013.01)

(56) References Cited

U.S. PATENT DOCUMENTS

| | | | |
|---|---|---|---|
| 3,762,522 A | | 10/1973 | Kirschling |
| 4,079,820 A | * | 3/1978 | Mattli ................ F16D 27/115 192/3.21 |
| 6,250,445 B1 | | 6/2001 | Davis |
| 6,543,561 B1 | * | 4/2003 | Pels et al. ................ B60K 6/26 180/65.23 |
| 2010/0314185 A1 | * | 12/2010 | Schoenek ................ B60K 6/36 180/65.7 |

FOREIGN PATENT DOCUMENTS

| | | |
|---|---|---|
| DE | 19532128 A1 | 3/1997 |
| DE | 10324487 A1 | 12/2004 |
| DE | 102005018259 A1 | 10/2006 |
| DE | 102008040499 A1 | 1/2010 |
| DE | 102008052254 A1 | 4/2010 |
| DE | 102010023135 A1 | 1/2011 |
| EP | 2447562 A2 | 5/2012 |
| FR | 1103662 A | 11/1955 |
| FR | 1224013 A | 6/1960 |
| JP | 2010274881 A | 12/2010 |
| WO | 2012048842 A1 | 4/2012 |

* cited by examiner

SHIFTABLE CLUTCH OF A HYBRID DRIVE

CROSS-REFERENCE TO RELATED APPLICATIONS

This application is a National Stage of International Application No. PCT/EP2014/050809 filed Jan. 16, 2014 and which claims priority to German Application No. 10 2013 201 318.3 filed Jan. 28, 2013. The entire disclosure of both applications is incorporated herein by reference.

TECHNICAL FIELD

The invention relates to a switchable clutch of a hybrid drive.

BACKGROUND

In hybrid vehicles, switchable clutches are used for example for the connection of an electric motor or for the separation of an internal combustion engine. To be able to switch the torques that prevail in a motor vehicle, use is made of hydraulically switchable clutches. The required hydraulic pressure is generated by a motor-pump unit and is fed to the cylinder-piston system via lines.

In the case of a hydraulic system, it is a basic disadvantage that there are high demands on the leak-tightness of the system. A further disadvantage is the outlay for filling during assembly, the measures for ventilation, the recycling of the hydraulic medium, the high temperature dependency of the viscosity, and the compressibility of the hydraulic fluid. The hydraulic working principle results in delivery flow and pressure pulsations in the case of hydrostatic positive displacement pumps being used, and also in operating noise (liquid-borne noise, body-borne noise), and high demands are placed on oil quality and filtration over the entire service life.

Electromagnetic actuators in the motor vehicle are operated using the 12-volt on-board electrical system. In the case of single-disk dry clutch embodiments, these normally serve for the connection of auxiliary assemblies and/or for the switching of multi-stage auxiliary assembly drives, for example the switching of a multi-stage compressor. Owing to the 12-volt on-board electrical system voltage, such clutches can only generate limited electromagnetic forces, and the transmissible clutch torques are correspondingly limited.

A hybrid module of a hybrid drive of a motor vehicle with an electric motor and a separating clutch is described in DE 10 2008 052 254 A1. The clutch is hydraulically actuated.

DE 10 2008 040 499 A1 presents a controllable separating clutch in a hybrid drivetrain of a motor vehicle. An input shaft and an output shaft lie in an axis, and the rotor of the electric motor is situated around the structural space of the spring-loaded clutch, which is hydraulically actuated.

An electric actuator for a device to be controlled is presented in DE 10 2005 018 259 A1. A drive and a transmission gearing act on a device; in the event of failure of the electrical supply, the clutch element opens.

Electromagnetic switching clutches are also known from DE 351 527 C and from DE 10 324 487 B4. JP 2010 274881 A presents an electromotive drive with input and output shafts and with two electrically switchable clutches integrated in the housing.

WO 2012/048842 A1 has disclosed a positively engaging clutch arrangement in which a stroke magnet effects an engagement of the clutch parts by way of an armature that can be pulled in. A spring element is arranged between the armature and one axially movable clutch part.

SUMMARY

It is the object of the present invention to propose a switchable clutch of a hybrid drive, which switchable clutch is of an improved design in relation to the known solutions.

Said object is achieved by means of the features of the device claim. Refinements emerge from the subclaims. In particular, the invention proposes an improved clutch arrangement which can be used in the arrangement as per claim 1 and the refinements thereof.

The solution according to the invention is composed of a friction disk clutch with an actuator, which can have electricity applied to it, for the actuation of the clutch in the sense of opening or closing (opening, closing the torque transmission path) and with a device for applying voltage to the clutch, the actuator, wherein said device effects an at least intermittent application of voltage with a voltage from the hybrid system, said voltage exceeding the 12-volt on-board electrical system voltage of the motor vehicle.

The clutch according to the invention is thus not, or not exclusively, operated using the 12-volt on-board electrical system voltage, and instead, the clutch uses a higher voltage that is present in the electrical hybrid system (the batteries) of a hybrid motor vehicle. The clutch for use according to the invention is designed, or electrically dimensioned, correspondingly. In accordance with the intermittent energization of the coil; the actuator, it may be provided that an actuator configured for the 12-volt on-board electrical system is used. The intermittent application of a higher voltage from the hybrid system is adapted to the 12-volt configuration and, by way of the overexcitation thereby attained, effects a faster clutch behavior and increase in switching behavior. In the activated state, lower levels of holding power are sufficient—the steady state is attained with 12-volt energization.

The invention makes it possible to realize a dry-running clutch system, which is free from drag torque and can be electromagnetically actuated, for use in the hybrid drivetrain of a motor vehicle. Through utilization of a high voltage level present in the hybrid vehicle (voltage level above the 12 volts of the on-board electrical system), it is possible, with low electrical consumption, to realize a compact construction of the magnet coil, and high torques can be transmitted with clutch dimensions that are neutral in terms of structural space.

The clutch system according to the invention can be used in a hybrid system for connecting the electric machine and/or separating the internal combustion engine. Owing to the high voltage level (for example 42V/180V/280V) already present in the hybrid vehicle, a compact construction of the magnet coil is possible, and high torques (for example 400 Nm) can be transmitted with clutch dimensions that are neutral in terms of structural space.

By way of example, the invention permits the following embodiments of the clutch:
- electromagnetically opening spring-pressure clutch (single-disk or multiplate clutch),
- electromagnetically closing single-disk or multiplate clutch,
- electromagnetically opening permanent-magnet clutch (single-disk or multiplate clutch).

The following are examples of preferred fields of use of the invention:
- connection of electric machines, disconnect applications,
AWD clutch,
actuator for torque-vectoring applications,
clutches for switchable auxiliary assembly drives.

The invention furthermore proposes an improved friction disk clutch with an actuator, which can have electricity applied to it, for the actuation of the friction disk clutch, which constitutes a preferred use in the case of the clutch system according to the invention.

One possible embodiment of the provided friction disk clutch has, articulatedly connected in alternating fashion to a clutch cage and to a clutch hub in rotationally conjoint and axially displaceable fashion, multiple disks, plates, a disk system. The actuator, the magnet coil causes the armature, the armature plate to be moved in the direction of the magnet coil, wherein the armature acts via a spring system positioned downstream between armature and disk system and/or a spring system positioned downstream of the disk system. Said spring, the spring system will hereinafter be referred to as series spring. The disk system is furthermore opened by a compression spring, such that the actuator opens counter to the force of said compression spring. Said compression spring will hereinafter be referred to as opening spring. This construction is referred to as "normally closed".

When the actuator is actuated, the coil is energized, a pressure is exerted on the disk system. Here, the armature plate does not act directly on the disk system; rather, the series spring, a compression spring, is positioned in the transmission chain or chain of action. The electromagnetic actuator thus acts on the disk system with resiliently elastic action. Here, the compression spring may be arranged on the actuator side or on the counterpressure side of the disk system.

The disk system has a spring stiffness, and thus likewise acts as a spring when a pressure is built up. The series spring arranged on the actuator side or on the counterpressure side is connected in series with the spring of the disk system. The opening spring of the disk system is connected in parallel with the two springs.

Another variant is the "normally open" device. In the case of such a clutch with disk system and electromagnetic actuation counter to a spring force, that is to say a clutch which is open in the non-energized state, the wear in the disk system or the tolerances in the air gap of the stroke magnet must be counteracted, allowed for, in the case of electromagnetic actuation. This leads to high holding currents and high levels of holding power in the closed state. This effect is even higher in the new state, as no wear has yet occurred and the air gap is at its largest. By means of the prestressed spring arranged in series with the disk system, the magnet can be closed as far as very small air gaps (theoretically to 0) by virtue of the prestressed spring being overcompressed, and the holding power thus minimized.

The primary demands on a separating clutch for a hybrid application are: complete closure and opening of the clutch; and torque regulation capability in the lower torque range.

A prestressed spring pack—the series spring—is positioned in the axial force flux of the multiplate pack (upstream or downstream of the multiplate pack). If the clutch is to be fully closed, the prestressed spring pack is overcompressed and the air gap is thus minimized. Precise torque regulation capability in the lower torque range is required for cranking the internal combustion engine up to speed (order of magnitude up to 150-250 Nm).

The overall stiffness of the system is determined by the series-connected stiffnesses of the series spring and the stiffness of the disk system in conjunction with the opening spring connected in parallel. The prestress force of the series spring is of such a magnitude that virtually no deformation of the series spring occurs in the lower torque range (regulation capability). Only when the clutch is to be fully closed is the series spring overcompressed.

DRAWINGS

The drawings described are for illustrative purposes only of selected embodiments of the invention, and include.

DESCRIPTION

An exemplary embodiment of the invention will be discussed below on the basis of the figures. Here, the figures each illustrate a clutch, wherein, in the upper half of the drawing, the associated coil is deenergized, and in the lower half of the drawing, the coil is energized. For illustration, FIG. 3 illustrates a usage situation in a hybrid vehicle.

Figure 3:
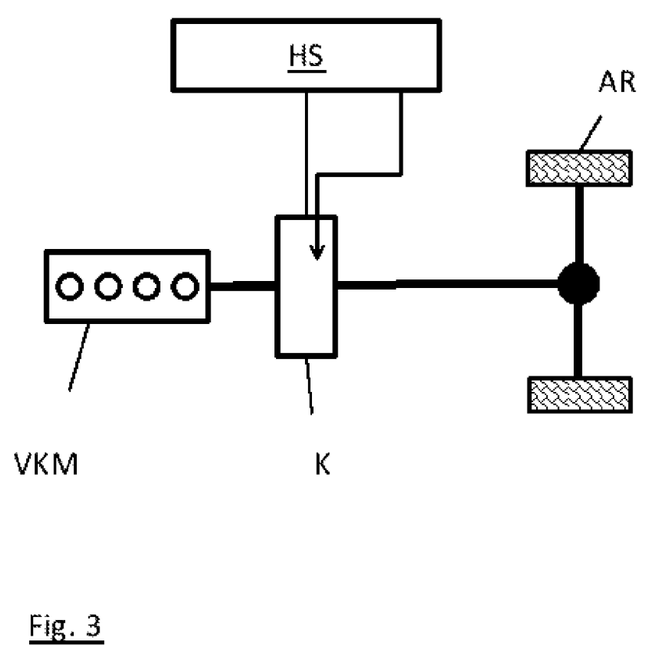
FIG. 3 schematically illustrates a drive system of a hybrid vehicle equipped with the clutches of the present invention.

FIG. 3 schematically illustrates the components of the drive of a hybrid vehicle. An internal combustion engine VKM acts on a downstream clutch K which, integrated therein, also has the activatable electric motor. At the output side, the torque output by the internal combustion engine VKM and/or electric motor acts, via a transmission which is not illustrated, on the drive wheels AR.

The illustrated drive, the electric motor integrated in the clutch K, is assigned a hybrid system HS, which has in particular the batteries and the components that control the charging and the drawing of current. The hybrid system provides voltages higher than 12 volts, for example 48V/180V/280V.

The hybrid system HS is connected to the electric motor, in which a clutch is arranged, and energizes said electric motor in accordance with the present driving situation. For coupling and separating the torque flow of the clutch K—depending on the design of the clutch K—the windings of the clutch K have applied to them the corresponding voltage of the hybrid system HS, that is to say a voltage considerably higher than the 12-volt on-board electrical system voltage.

Owing to the higher voltage level, lower electrical consumption and thus a more compact construction of the clutch, of the electric actuator of the clutch K are possible.

Figure 1A:
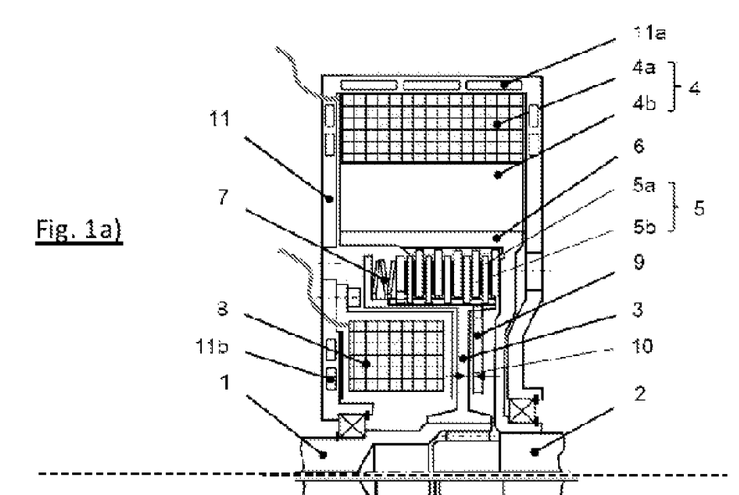
FIGS. 1a and 1b illustrate an embodiment of a clutch constructed in accordance with the present invention.
Figure 1B:
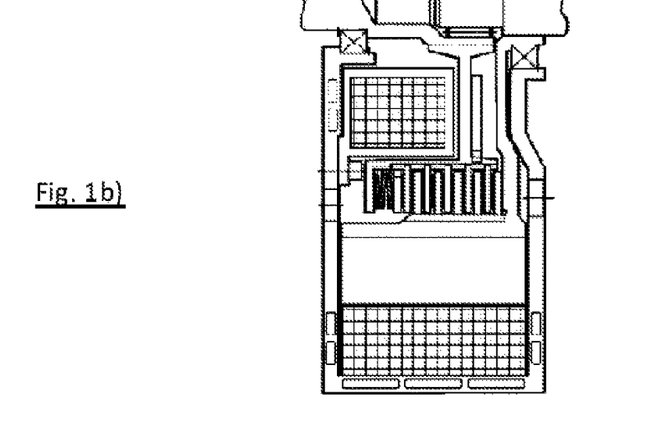

FIGS. 1a and 1b illustrate an exemplary embodiment of a clutch according to the invention that can be actuated by way of a voltage of the hybrid system, said voltage exceeding the 12-volt on-board electrical system voltage. In the embodiment according to FIGS. 1a and 1b, the clutch is designed as a spring-actuated, dry-running (electromagnetically opening) multiplate friction clutch for a hybrid head application.

A drive input shaft 1 is connected in frictionally engaging fashion to the drive output shaft 2 by way of the multiplate clutch 5, 5a, 5b. The axes of the drive input and drive output shaft 1, 2 are in alignment. A clutch hub 3 is connected in positively engaging fashion to the drive input shaft 1, and a clutch cage 6 is connected in positively engaging fashion to the drive output shaft 2.

In the embodiment illustrated, the clutch is closed in spring-actuated fashion by way of the prestress force of a plate spring pack 7, and torque is transmitted from the drive input shaft 1 to the drive output shaft 2 (FIG. 1a).

When a voltage is applied to the magnet coil 8, an axially movable disengagement plate 9 is pulled across the air gap 10 and against the clutch hub 3 by the action of the force of the electromagnetic field. Here, the spring pack 7 is overcompressed by means of the disengagement plate, and the multiplate clutch 5, 5a, 5b is ventilated so as to be free from residual torque (FIG. 1b).

For use as hybrid head, the rotor 4b of an electric motor, of an electric machine 4 is connected by way of the clutch cage 6 to the drive output shaft 2. The stator 4a is optionally cooled by way of cooling water ducts 11a, 11b which are integrated in the housing 11 of the arrangement and which can likewise serve for cooling the magnet coil core 8.

Figure 2A:
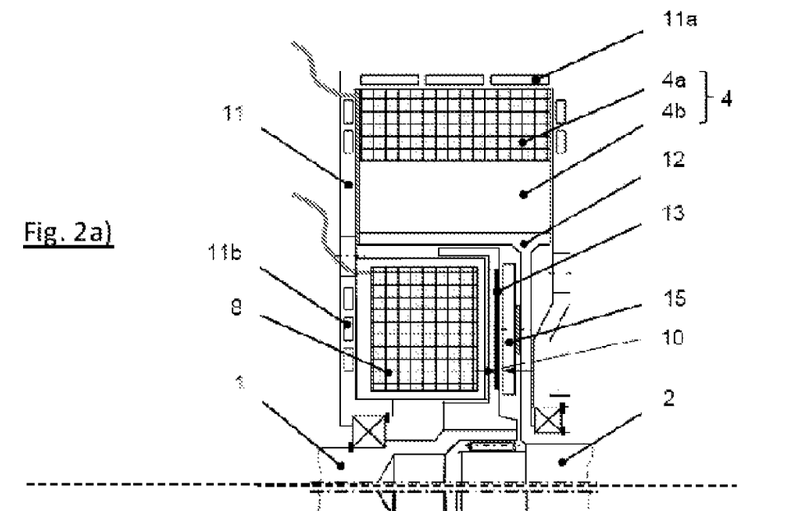
FIGS. 2a and 2b illustrate an alternative embodiment of a clutch constructed in accordance with the present invention.
Figure 2B:
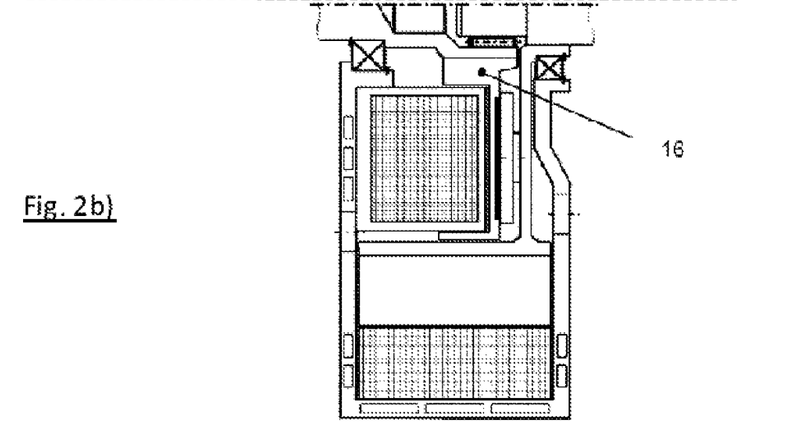

FIGS. 2a and 2b illustrate a further exemplary embodiment of a clutch according to the invention that can be actuated by way of a voltage of the hybrid system, said voltage exceeding the 12-volt on-board electrical system voltage, which clutch is in the form of an (electromagnetically closing) single-surface friction clutch for a hybrid head application. By application of an electrical voltage to the magnet coil 8, an armature disk 15 is pulled across the air gap 10 to the hub body 16 by the action of the force of the magnetic field. The axial force thus generated effects a frictionally engaging connection between the axially movable armature disk 15, which is connected rotationally conjointly to the drive output shaft 2, and the friction lining 13 that is arranged in the hub body 16. The torque is transmitted without play between the drive input shaft 1 and drive output shaft 2 (FIG. 2b). For use as hybrid head, the rotor 4b of an electric machine 4 is connected by way of the rotor hub 12 to the drive output shaft 2. FIG. 2a illustrates the released state of the clutch—the coil 8 is deenergized.

Figure 4:
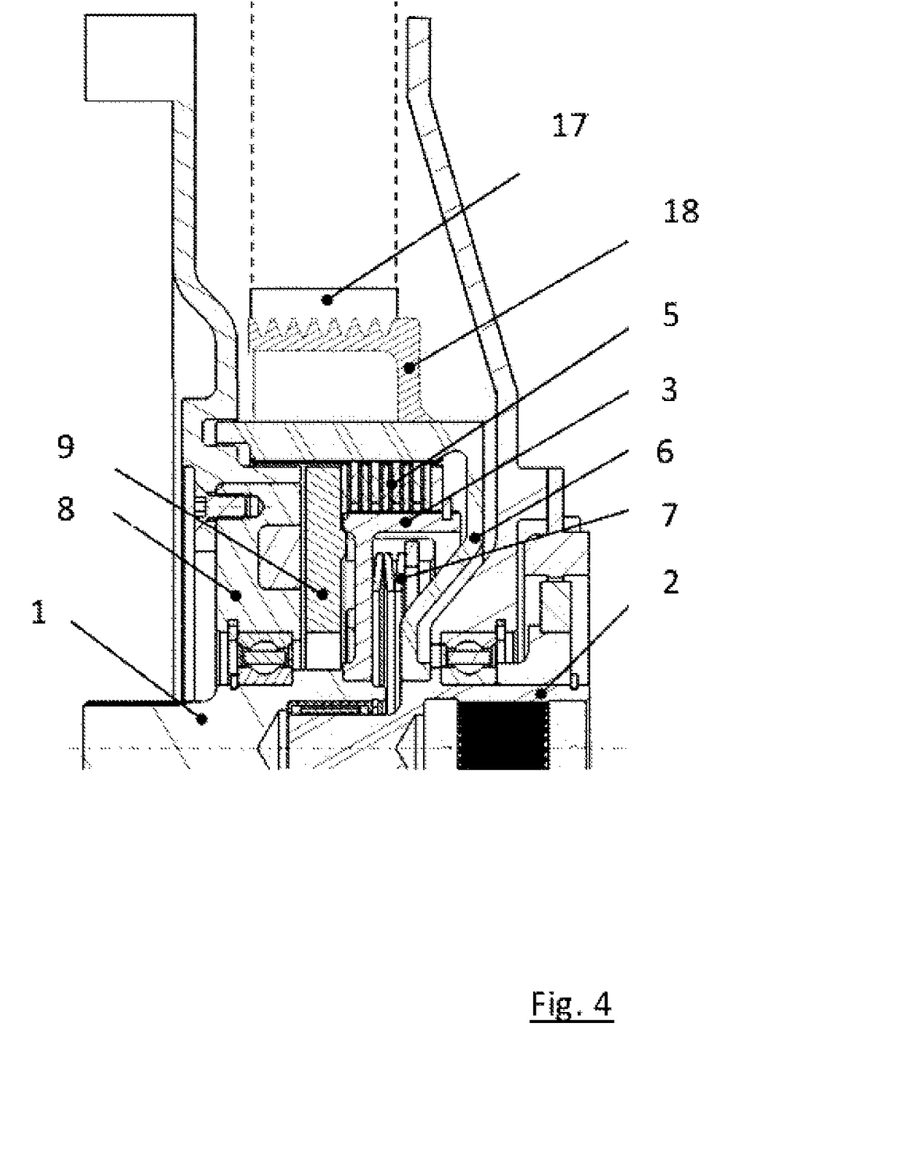
FIG. 4 illustrates another alternative embodiment of a clutch constructed in accordance with the present disclosure.

FIG. 4 illustrates a further exemplary embodiment of the clutch component according to the invention for use in a hybrid system, in which the electric motor, the rotor shaft thereof is seated parallel with respect to the crankshaft of the internal combustion engine. The switching clutch is seated between internal combustion engine and the transmission of the motor vehicle. The electric motor provides a feed to the clutch via a traction mechanism, a belt. FIG. 4 illustrates a clutch of the "normally closed" embodiment; thus, the coil must be energized in order to open the clutch. In the exemplary embodiment shown, the drive input shaft 1 is connected in frictionally engaging fashion to the drive output shaft 2 by way of the multiplate clutch 5. The clutch hub 3 is connected in positively engaging fashion to the drive input shaft 1, and the clutch cage 6 is connected in positively engaging fashion to the drive output shaft 2.

The clutch is closed in spring-actuated fashion by way of the prestress force of the plate spring pack 7, and thus permits a transmission of torque from the drive input shaft 1 to the drive output shaft 2. After a voltage is applied to the magnet coil 8, the armature plate 9, which is of T-shaped form, is pulled against the plate spring pack 7 by the action of force of an electromagnetic field, and the clutch is ventilated so as to be free from residual torque. A stop for the end position of the armature plate 9 may be realized either by way of a mechanical stop on the clutch hub 3 or else by way of the magnet coil 8 itself, for example by virtue of a sliding coating being provided on the magnet body.

The electric machine (not illustrated) is arranged parallel to the crankshaft and is connected by way of the belt drive 17 and the belt pulley 18 to the clutch cage 6 and consequently to the drive output shaft 2.

Figure 5:
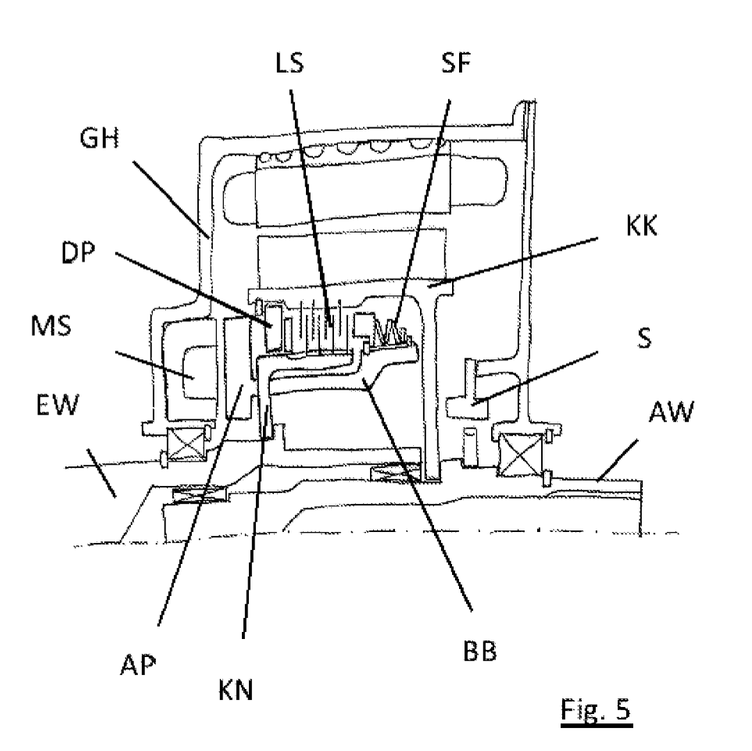
FIG. 5 illustrates a friction disk clutch constructed in accordance with the teachings of the present invention.

FIG. 5 illustrates a first embodiment of the friction disk clutch according to the invention. The clutch couples an input shaft EW to an output shaft AW. A housing GH is mounted on the coaxial shafts EW, AW by way of two bearings. Furthermore, the shafts EW, AW are mounted on one another by way of bearings. The clutch cage KK is connected rotationally conjointly to the output shaft AW. The clutch hub KN is connected rotationally conjointly to the input shaft EW. Between the clutch hub KN and clutch cage KK, the plates and disks of the multiplate system LS are articulatedly connected in alternating fashion in a manner known per se. Owing to its shaping, the multiplate system LS of the clutch has a spring stiffness C2.

An armature plate AP is situated opposite a magnet coil MS which is arranged fixedly with respect to the housing, and said armature plate acts on the multiplate system LS by way of an actuation collar BB, which extends through the clutch hub KN, and by way of a series spring SF in the form of a plate spring pack. The plate spring pack of the series spring SF has the spring stiffness C1. Arranged opposite the plate spring pack of the series spring SF is a thrust plate DP which forms the counterbearing for the pressure on the multiplate system LS. Between the armature plate AP and clutch hub KN there is arranged an opening spring (not illustrated) by means of which the clutch is opened and counter to the force, the stiffness C3 of which the actuator (magnet coil MS—armature plate AP) acts. Arranged between the clutch cage KK and housing GH are a stator and rotor of an electric motor—as has been shown and described with regard to the exemplary embodiment of FIG. 1. Furthermore, in the housing GH, there is arranged a sensor S which interacts with an encoder element of the output shaft AW.

Figure 6:
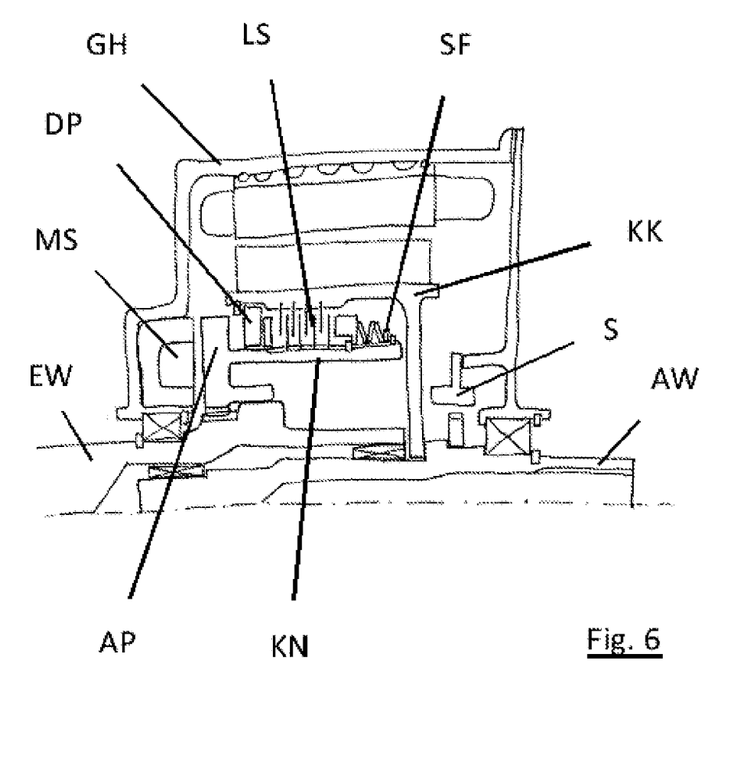
FIG. 6 illustrates an alternative embodiment of the friction disk clutch of the present invention.

In the embodiment as per FIG. 6, the armature plate AP acts directly on the clutch hub KN; the latter is mounted rotationally conjointly, and in axially displaceable fashion, relative to the shaft EW. In this embodiment, the armature plate and the clutch hub KN and the series spring SF exert the pressure on the multiplate system LS.

Figure 7:
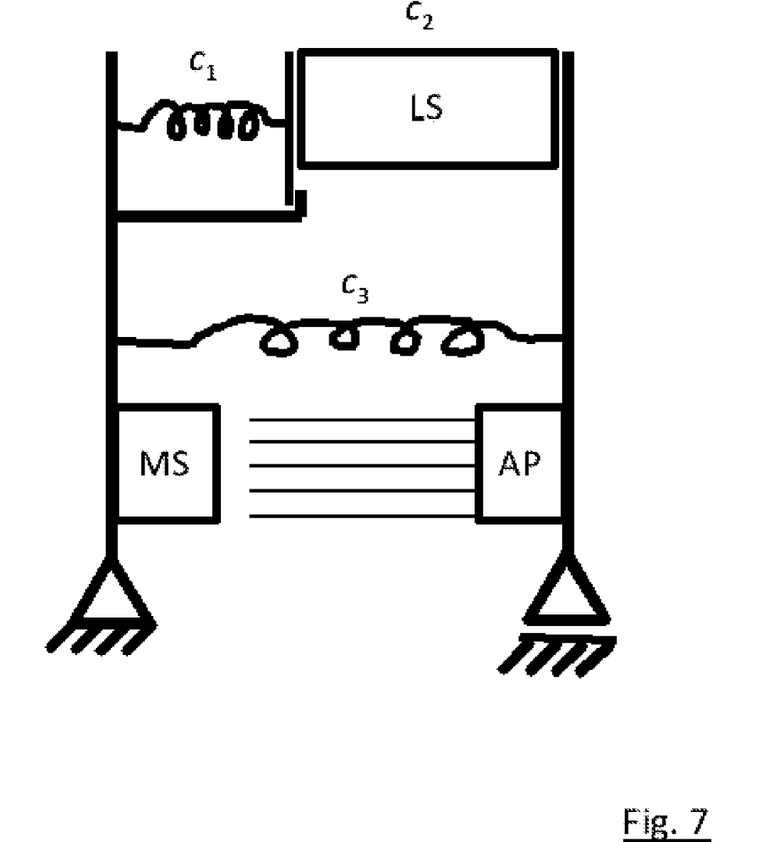
FIG. 7 diagrammatically illustrates the friction disk clutches of the present invention.

FIG. 7 is an equivalent diagram of the friction disk clutch according to the invention. The illustration shows the magnet coil MS with the armature plate AP, the opening spring which effects the opening of the clutch and which has the stiffness C3, and the spring stiffness of the multiplate system LS-C2—and of the series spring SF-C1. The left-hand bearing is in this case a fixed bearing, the right-hand bearing being displaceable.

Figure 8:
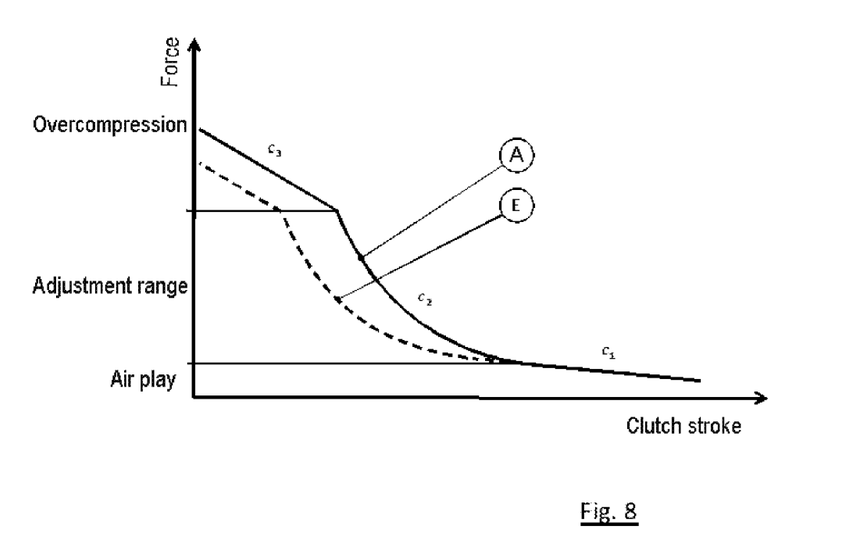
FIG. 8 is a plot illustrating example stiffness characteristic curves of the friction disk clutches.

The diagram of FIG. 8 illustrates the stiffness characteristic curves of the clutch at the start of service life (A) and, after wear of the clutch plates, at the end of service life (E)—plotted versus the force (actuator, in the multiplate system) as a function of the clutch stroke.

When the magnet armature is attracted, initially, the stiffness C1 of the series spring SF is effective (air gap—air play). When the biting point is reached, in sum total, the plate pack stiffness C2 is effective. The spring pack C3 is prestressed to such an extent that, in the lower torque range, no deformation of C3 occurs (adjustment range). This yields a regulation capability in the lower torque range similar to that in a system without prestressed spring pack, a series spring.

Figure 9:
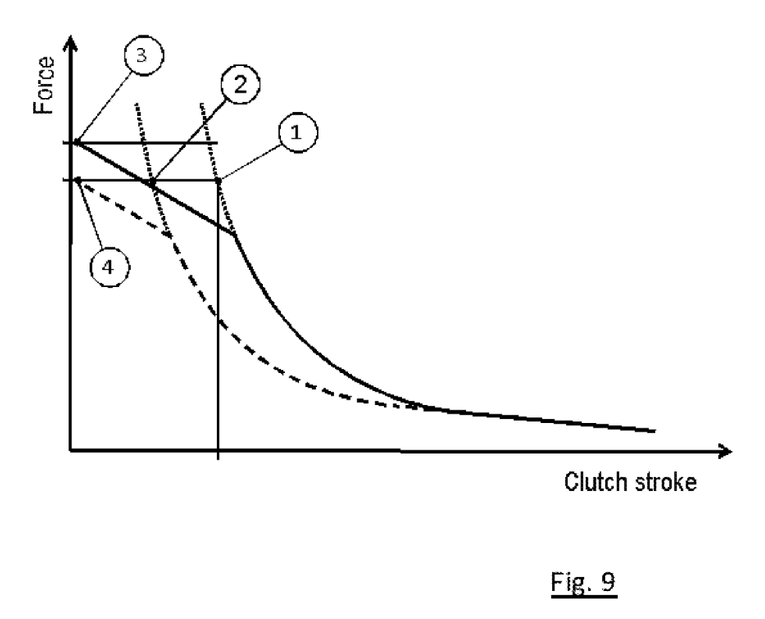
FIG. 9 is a plot of the actuation force versus clutch stroke characteristics of the clutches of the present invention.

If the clutch is to be fully closed, the spring pack C3 is overcompressed, and the air gap of the magnet is reduced to a minimum dimension. The force required for this purpose for closing the clutch in the new state (point 3, no wear) is higher than the force required in the case of a system without spring pack (point 1), but this arises in the presence of a very small air gap (FIG. 9). Owing to the intensely progressive force characteristic of a stroke magnet, the power demand at point P3 can be significantly reduced in relation to a system without the prestressed spring pack, the series spring. Toward the end of service life, the force in the attracted state falls to the point P4, which then corresponds exactly to the force level of the system without the prestressed spring pack P2. In this case, too, the power demand can be reduced considerably, as the air gap becomes minimal.

LIST OF REFERENCE SIGNS

1 Drive input shaft
2 Drive output shaft
3 Clutch hub
4 Electric motor
4a Stator
4b Rotor
5 Clutch, multiplate clutch
5a Clutch disk, lamella
5b Clutch disk
6 Clutch cage
7 Disk spring pack
8 Magnet coil, coil, actuator
9 Disengagement plate, armature plate
10 Air gap
11 Housing
11a, 11b Cooling water duct
12 Rotor hub
13 Friction lining
15 Armature disk
16 Hub body
17 Belt, belt drive
18 Belt pulley
VKM Internal combustion engine
K Clutch
AR Drive wheels
HS Hybrid system, voltage system of hybrid drive
GH Housing
EW Input shaft
AW Output shaft
LS Multiplate system
SF Series spring
KK Clutch cage
KN Clutch hub
BB Actuation collar
MS Magnet coil
DP Thrust plate
AP Armature plate
S Sensor

The invention claimed is:

1. A switchable clutch for a motor vehicle with hybrid drive, wherein the hybrid drive has a voltage system with a voltage exceeding a 12-volt on-board electrical system voltage of the motor vehicle, the switchable clutch comprising a friction disk clutch and an electrically energizable actuator for the actuation of the friction disk clutch in the sense of opening or closing, wherein the actuator can at least intermittently be actuated with a voltage of the voltage system of the hybrid drive, said voltage exceeding the 12-volt on-board electrical system voltage of the motor vehicle, wherein the friction disk clutch is configured as a clutch which is closed by energization of the actuator and which is opened counter to the force of a spring, and wherein the force of the actuator is exerted on a multiplate system via a series spring.

2. The switchable clutch as claimed in claim 1, wherein the friction disk clutch is configured as a clutch which is closed by energization of the actuator and which is otherwise open.

3. The switchable clutch as claimed in claim 2, wherein the actuator interacts with an axially moveable disk, wherein the axially movable disk is in the form of an armature disk which interacts with the actuator in the form of a coil and which effects the closing of the friction disk clutch when the actuator is energized.

4. The switchable clutch as claimed in claim 1, wherein a controller connected upstream of the actuator is configured to perform the energization of the actuator with different voltages, and wherein at least one of the voltages exceeds the 12-volt on-board electrical system voltage of the motor vehicle and is drawn from the voltage system of the hybrid drive.

5. The switchable clutch as claimed in claim 1, wherein the clutch includes a clutch hub which is connected to a drive input shaft, a clutch cage which is connected to a drive output shaft, and an electric motor.

6. The switchable clutch as claimed in claim 5, wherein the friction disk clutch includes the multiplate system arranged between the clutch hub and the clutch cage.

7. The switchable clutch as claimed in claim 1, wherein the actuator interacts with an axially movable disk.

8. The switchable clutch as claimed in claim 7, wherein the axially movable disk interacts with the actuator in the form of a coil and which effects the closing of the friction disk clutch when the actuator is energized.

9. The switchable clutch as claimed in claim 1, wherein the actuator interacts with an armature plate which exerts the force of the actuator on the multiplate system, which is supported on an axially fixed thrust plate, via the series spring.

10. The switchable clutch as claimed in claim 1, wherein the actuator interacts with an armature plate which exerts the force of the actuator on the multiplate system, which is supported on a thrust plate which is supported via the series spring.

11. The switchable clutch as claimed in claim 1, wherein the actuator interacts with an armature plate which acts on the multiplate system via an actuation collar that extends through a clutch hub.

12. The switchable clutch as claimed in claim 1, wherein the actuator interacts with an armature plate which is connected to a clutch hub, which clutch hub is mounted in rotationally conjoint and axially displaceable fashion on a shaft and transmits the actuation pressure to the multiplate system.

* * * * *